(12) United States Patent
Ma et al.

(10) Patent No.: US 9,157,743 B2
(45) Date of Patent: Oct. 13, 2015

(54) SYSTEMS AND METHODS FOR CORRELATING REDUCED EVIDENCE GRIDS

(75) Inventors: Yunqian Ma, Plymouth, MN (US); Michael Ray Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 593 days.

(21) Appl. No.: 13/552,174

(22) Filed: Jul. 18, 2012

(65) Prior Publication Data

US 2014/0025331 A1    Jan. 23, 2014

(51) Int. Cl.
| | | |
|---|---|---|
| G06F 17/00 | (2006.01) |
| G01P 15/02 | (2013.01) |
| G01C 21/00 | (2006.01) |
| G01S 17/89 | (2006.01) |
| G01S 5/02 | (2010.01) |
| G01S 17/93 | (2006.01) |

(52) U.S. Cl.
CPC ............. *G01C 21/005* (2013.01); *G01S 5/0252* (2013.01); *G01S 17/89* (2013.01); *G01S 17/936* (2013.01)

(58) Field of Classification Search
CPC ..... G01C 21/005; G01S 17/89; G01S 5/0252; G01S 17/936
USPC .......... 702/141, 150; 701/445, 510, 221, 209, 701/400, 409, 408; 345/420, 419, 427, 629, 345/325, 424; 382/154
See application file for complete search history.

(56) References Cited

U.S. PATENT DOCUMENTS

| | | | |
|---|---|---|---|
| 5,045,860 | A | 9/1991 | Hodson |
| 5,087,916 | A | 2/1992 | Metzdorff et al. |
| 5,257,347 | A | 10/1993 | Busbridge et al. |
| 5,563,513 | A | 10/1996 | Tasci et al. |
| 5,596,659 | A | 1/1997 | Normile et al. |

(Continued)

FOREIGN PATENT DOCUMENTS

| | | |
|---|---|---|
| GB | 2162014 | 1/1986 |
| WO | 2007028932 | 3/2007 |

OTHER PUBLICATIONS

U.S. Patent and Trademark Office, "Office Action", "from U.S. Appl. No. 12/963,893", Nov. 20, 2013, pp. 1-21, Published in: US.

(Continued)

*Primary Examiner* — Carol S Tsai
(74) *Attorney, Agent, or Firm* — Fogg & Powers LLC

(57) ABSTRACT

A system is provided for correlating evidence grids. In certain embodiments, the system includes a sensor that generates signals describing a current section of an environment; a memory configured to store measurements of historical sections of the environment; and a processor coupled to the sensor and configured to calculate navigation parameters based on signals received from the sensor. Further, the processor converts the signals received from the sensor into a current evidence grid and removes data from the current evidence grid to form a reduced evidence grid; converts the measurements of historical sections into a historical evidence grid; and correlates the reduced evidence grid with the historical evidence grid by adjusting position and orientation of the reduced evidence grid and the historical evidence grid in relation to one another and calculating correlative values, and searching for a highest correlative value.

20 Claims, 10 Drawing Sheets

(56) References Cited

U.S. PATENT DOCUMENTS

| | | | |
|---|---|---|---|
| 5,649,030 A | 7/1997 | Normile et al. | |
| 5,755,400 A | 5/1998 | Kalms, III | |
| 5,822,465 A | 10/1998 | Normile et al. | |
| 5,878,373 A | 3/1999 | Cohen et al. | |
| 6,218,980 B1 | 4/2001 | Goebel et al. | |
| 6,282,362 B1 | 8/2001 | Murphy et al. | |
| 6,389,354 B1 | 5/2002 | Hicks et al. | |
| 6,400,313 B1 | 6/2002 | Morici et al. | |
| 6,912,464 B1 | 6/2005 | Parker | |
| 7,446,766 B2 * | 11/2008 | Moravec | 345/424 |
| 7,584,020 B2 | 9/2009 | Bruemmer et al. | |
| 7,719,664 B1 | 5/2010 | Flowers | |
| 8,427,472 B2 * | 4/2013 | Moravec | 345/420 |
| 8,463,036 B1 | 6/2013 | Ramesh et al. | |
| 8,818,722 B2 * | 8/2014 | Elgersma et al. | 701/514 |
| 8,855,911 B2 * | 10/2014 | Ma et al. | 701/400 |
| 2002/0147544 A1 | 10/2002 | Nicosia et al. | |
| 2002/0181762 A1 | 12/2002 | Silber | |
| 2004/0145496 A1 | 7/2004 | Ellis | |
| 2004/0167717 A1 | 8/2004 | Buchanan et al. | |
| 2004/0178945 A1 | 9/2004 | Buchanan | |
| 2006/0044431 A1 | 3/2006 | Ovsiannikov | |
| 2006/0125680 A1 * | 6/2006 | Thackray | 342/54 |
| 2006/0157639 A1 | 7/2006 | Shaffer et al. | |
| 2006/0178828 A1 * | 8/2006 | Moravec | 701/211 |
| 2007/0046448 A1 | 3/2007 | Smitherman | |
| 2008/0009966 A1 | 1/2008 | Bruemmer et al. | |
| 2008/0035834 A1 | 2/2008 | Gleckler | |
| 2008/0086236 A1 | 4/2008 | Saito et al. | |
| 2008/0100822 A1 | 5/2008 | Munro | |
| 2008/0103699 A1 | 5/2008 | Hanna et al. | |
| 2008/0169964 A1 | 7/2008 | Hawkinson | |
| 2008/0181487 A1 | 7/2008 | Hsu et al. | |
| 2008/0231504 A1 | 9/2008 | Sartor et al. | |
| 2008/0232709 A1 | 9/2008 | Rahmes et al. | |
| 2008/0234981 A1 | 9/2008 | Sartor et al. | |
| 2008/0273752 A1 | 11/2008 | Zhu et al. | |
| 2009/0103779 A1 | 4/2009 | Loehlein et al. | |
| 2009/0119010 A1 * | 5/2009 | Moravec | 701/209 |
| 2009/0238473 A1 * | 9/2009 | McKitterick | 382/228 |
| 2009/0322742 A1 | 12/2009 | Muktinutalapati et al. | |
| 2010/0017060 A1 | 1/2010 | Zhang et al. | |
| 2010/0063730 A1 * | 3/2010 | Case et al. | 701/210 |
| 2011/0026837 A1 | 2/2011 | Kita | |
| 2011/0060478 A1 | 3/2011 | Nickolaou | |
| 2011/0069175 A1 | 3/2011 | Mistretta et al. | |
| 2011/0243476 A1 | 10/2011 | Sieracki | |
| 2011/0254833 A1 | 10/2011 | McDaniel et al. | |
| 2012/0150441 A1 | 6/2012 | Ma et al. | |
| 2012/0159441 A1 * | 6/2012 | Ghaisas | 717/123 |
| 2013/0131984 A1 * | 5/2013 | Elgersma et al. | 701/514 |

OTHER PUBLICATIONS

U.S. Patent and Trademark Office, "Notice of Allowance", "from U.S. Appl. No. 13/302,831", Nov. 18, 2013, pp. 1-11, Published in: US.

European Patent Office, "Communication under Rule 71(3) EPC","from Foreign Counterpart of U.S. Appl. No. 12/963,893", Feb. 15, 2013, pp. 1-29, Published in: EP.

U.S. Patent and Trademark Office, "Office Action", "U.S. Appl. No. 13/302,831", Apr. 11, 2013, pp. 1-34.

U.S. Patent and Trademark Office, "Office Action", "U.S. Appl. No. 12/963,893", Jun. 13, 2013, pp. 1-43.

European Patent Office, "Office Action", "from Foreign Counterpart of U.S. Appl. No. 12/963,893", Sep. 5, 2012, pp. 1-5, Published in: EP.

Alfano et al., "Capacity of MIMO Channels with One-sided Correlation", "ISSSTA2004", Aug. 30-Sep. 2, 2004, pp. 515-519, Publisher: IEEE, Published in: AU.

Delmarco et al., "Application of a Dynamic Feature Selection Algorithm to Multi-Sensor Image Registration", Apr. 9, 2007, pp. 1-12, vol. 6567, No. 17.

European Patent Office, "European Search Report" from foreign counterpart of U.S. Appl. No. 12/963,893, mailed Jun. 28, 2012, Published in: EP.

Kulich et al. , "Robust Data Fusion With Occupancy Grid", "IEEE Transactions on Systems, Man and Cybernetics: Part C: Applications and Reviews", Feb. 1, 2005, pp. 106-115, vol. 35, No. 1, Publisher: IEEE Service Center.

Gerlek, "Compressing Lidar Data", "Photogrammetric Engineering & Remote Sensing", Nov. 2009, pp. 1253-1255.

Nieto, "Scan-SLAM: Combining EKF-SLAM and Scan Correlation", "Proceedings of International Conference on Field and Service Robotics", Jul. 2005, pp. 1-12.

Novak, "Correlation Algorithms for Radar Map Matching", "IEEE Transactions on Aerospace and Electronic Systems", Jul. 1978, pp. 641-648, vol. AES-14, No. 4, Publisher: IEEE.

Novak, "Radar Detection and Map-Matching Algorithm Studies", "IEEE Transactions on Aerospace and Electronic Systems", Sep. 1980, pp. 620-625, vol. AES16, No. 5, Publisher: IEEE.

Elgersma et al., "Rapid Lidar Image Correlation for Ground Navigation", "U.S. Appl. No. 13/302,831", Nov. 22, 2011, pp. 1-63.

European Patent Office, "Office Action", "from Foreign Counterpart of U.S. Application", Sep. 5, 2012, pp. 1-5, Published in: EP.

European Patent Office, "European Search Report", "from Foreign Counterpart of U.S. Appl. No. 13/552,174", Nov. 4, 2013, pp. 1-4, Published in: EP.

Elfes, "Using Occupancy Grids for Mobile Robot Perception and Navigation", 2001, pp. 1-12, Publisher: IEEE.

Martin et al., "Robot Evidence Grids", Mar. 1996, pp. 1-49, Publisher: Carnegie Mellon University, Published in: US.

European Patent Office, "Office Action", "from Foreign Counterpart of U.S. Appl. No. 13/552,174", Nov. 4, 2013, pp. 1-7, Published in: EP.

European Patent Office, "Office Action", "from Foreign Counterpart of U.S. Appl. No. 13/302,831", Oct. 1, 2013, pp. 1-6, Published in: EP.

U.S. Patent and Trademark Office, "Notice of Allowance", "from U.S. Appl. No. 13/302,831", May 8, 2014, pp. 1-9, Published in: US.

U.S. Patent and Trademark Office, "Notice of Allowance", "from U.S. Appl. No. 12/963,893", Jun. 6, 2014, pp. 1-12, Published in: US.

European Patent Office, "European Search Report", "from Foreign Counterpart of U.S. Appl. No. 13/302,831", Sep. 11, 2013.

U.S. Patent and Trademark Office, "Office Action", "U.S. Appl. No. 13/302,831", Jul. 18, 2013, pp. 1-27.

* cited by examiner

FIG. 3

| 1 | 0 | 0 | 0 | 0 | 0 | 0 | 0 | 0 | 0 |
|---|---|---|---|---|---|---|---|---|---|
| 0 | 1 | 0 | 0 | 0 | 0 | 0 | 0 | 0 | 0 |
| 0 | 1 | 1 | 1 | 1 | 0 | 0 | 0 | 0 | 0 |
| 0 | 0 | 0 | 0 | 1 | 0 | 0 | 0 | 1 | 1 |
| 0 | 0 | 0 | 0 | 0 | 1 | 0 | 0 | 1 | 0 |
| 0 | 0 | 0 | 0 | 1 | 1 | 0 | 1 | 0 | 0 |
| 0 | 0 | 0 | 0 | 0 | 1 | 0 | 0 | 1 | 0 |
| 0 | 0 | 0 | 0 | 0 | 1 | 1 | 0 | 1 | 0 |
| 0 | 0 | 0 | 0 | 0 | 0 | 0 | 1 | 1 | 0 |
| 0 | 0 | 0 | 0 | 0 | 0 | 0 | 1 | 1 | 0 |

802

| 0 | 1 | 1 | 1 | 1 | 0 | 0 | 0 | 0 | 0 |
|---|---|---|---|---|---|---|---|---|---|
| 0 | 0 | 0 | 0 | 1 | 0 | 0 | 0 | 1 | 1 |
| 0 | 0 | 0 | 0 | 0 | 1 | 0 | 0 | 1 | 0 |
| 0 | 0 | 0 | 0 | 1 | 1 | 0 | 1 | 0 | 0 |
| 0 | 0 | 0 | 0 | 0 | 1 | 0 | 0 | 1 | 0 |
| 0 | 0 | 0 | 0 | 0 | 1 | 1 | 0 | 1 | 0 |
| 0 | 0 | 0 | 0 | 0 | 0 | 0 | 1 | 1 | 0 |
| 0 | 0 | 0 | 0 | 0 | 0 | 0 | 1 | 1 | 0 |
| 1 | 1 | 0 | 0 | 0 | 1 | 1 | 0 | 0 | 0 |
| 0 | 0 | 1 | 1 | 1 | 0 | 0 | 0 | 0 | 0 |

804

808

| 0 | 0 | 0 | 0 | 0 | 1 | 1 | 1 | 0 | 0 | 0 | 0 | 0 | 0 | 0 | 0 | 0 |
|---|---|---|---|---|---|---|---|---|---|---|---|---|---|---|---|---|
| 0 | 0 | 0 | 1 | 1 | 0 | 1 | 1 | 3 | 2 | 1 | 0 | 0 | 0 | 0 | 0 | 0 |
| 0 | 1 | 1 | 0 | 1 | 1 | 2 | 3 | 3 | 4 | 3 | 2 | 1 | 0 | 0 | 0 | 0 |
| 0 | 1 | 2 | 1 | 2 | 3 | 2 | 2 | 1 | 2 | 3 | 3 | 2 | 2 | 2 | 1 | 0 |
| 0 | 1 | 2 | 4 | 4 | 3 | 1 | 1 | 1 | 0 | 1 | 2 | 4 | 3 | 1 | 1 | 2 | 1 |
| 0 | 1 | 2 | 2 | 5 | 4 | 3 | 1 | 1 | 3 | 4 | 4 | 3 | 2 | 2 | 0 | 1 | 1 | 0 |
| 0 | 0 | 3 | 1 | 4 | 6 | 4 | 5 | 3 | 3 | 5 | 3 | 2 | 3 | 2 | 2 | 1 | 0 | 0 |
| 0 | 1 | 1 | 2 | 2 | 6 | 5 | 5 | 5 | 4 | 3 | 4 | 5 | 4 | 2 | 1 | 1 | 1 | 0 |
| 0 | 1 | 1 | 1 | 2 | 6 | 7 | 5 | 6 | 8 | 3 | 2 | 4 | 4 | 4 | 2 | 1 | 1 | 0 |
| 0 | 1 | 2 | 2 | 2 | 4 | 8 | 6 | 8 | 6 | 5 | 4 | 4 | 3 | 2 | 2 | 1 | 0 |
| 0 | 1 | 2 | 2 | 2 | 3 | 5 | 5 | 9 | 11 | 7 | 5 | 4 | 2 | 0 | 1 | 2 | 1 | 0 |
| 0 | 0 | 0 | 0 | 1 | 1 | 5 | 4 | 8 | 21 | 8 | 4 | 5 | 1 | 1 | 0 | 0 | 0 | 0 |
| 0 | 0 | 0 | 0 | 0 | 2 | 3 | 2 | 5 | 9 | 7 | 4 | 4 | 3 | 2 | 2 | 2 | 1 | 0 |
| 0 | 0 | 0 | 0 | 1 | 2 | 2 | 2 | 4 | 6 | 6 | 5 | 6 | 3 | 1 | 1 | 1 | 0 | 0 |
| 0 | 0 | 0 | 0 | 0 | 1 | 2 | 1 | 2 | 6 | 5 | 4 | 7 | 4 | 1 | 1 | 0 | 0 | 0 |
| 0 | 0 | 0 | 0 | 0 | 1 | 2 | 1 | 2 | 3 | 3 | 4 | 4 | 4 | 1 | 1 | 0 | 0 |
| 0 | 0 | 0 | 0 | 0 | 0 | 0 | 1 | 3 | 2 | 1 | 3 | 4 | 4 | 2 | 1 | 1 | 0 | 0 |
| 0 | 0 | 0 | 0 | 0 | 0 | 0 | 1 | 2 | 1 | 0 | 0 | 2 | 3 | 2 | 2 | 1 | 0 | 0 |
| 0 | 0 | 0 | 0 | 0 | 0 | 0 | 0 | 0 | 0 | 0 | 0 | 1 | 2 | 2 | 2 | 1 | 0 | 0 |

SYSTEMS AND METHODS FOR CORRELATING REDUCED EVIDENCE GRIDS

BACKGROUND

Evidence grids are representations of terrain data obtained from sensors that measure characteristics of an environment. In at least one implementation, the sensors can acquire range and angle measurements of terrain features in the environment of the sensor. When the sensor is attached to a moving vehicle, evidence grids created at different times can provide navigational information that can be used to map the terrain and aid in providing a navigational solution for the vehicle. When evidence grids are used to provide navigational information, previously obtained data is combined to form a historical evidence grid, while recently obtained data is combined to form a current evidence grid. The historical evidence grid can be viewed as a compact view of the world that can be updated in real time. As such, the historical evidence grid is different from a fixed terrain map, such as the Digital Terrain Elevation Data (DTED), where DTED is a standard of digital datasets that includes a matrix of terrain elevation values. To determine the current position of a vehicle, a system correlates the current evidence grid with the historical evidence grid. The current evidence grid is adjusted through six degrees of freedom (three translational degrees of freedom along three perpendicular axes and three rotational degrees of freedom about the three perpendicular axes) to match the current evidence grid to the historical evidence grid. The adjustments can be processed to determine the movement of the vehicle since the historical evidence grid was created.

However, because both the current evidence grid and the historical evidence grid can also be used for path planning and obstacle avoidance (along with navigation), the evidence grids contain data describing empty space and the space inside objects in the environment, significantly increasing the amount of memory consumed by each evidence grid. For example, a single historical evidence grid can contain 5 million data points and use up to 120 MB of memory. The amount of data contained in evidence grids inhibits the ability of processors to correlate different evidence grids in a timely manner and may prevent evidence grids from being used for navigation in applications with faster time requirements.

SUMMARY

A system is provided for correlating evidence grids. In certain embodiments, the system includes a sensor configured to generate signals describing a current section of an environment relative to the system; a memory configured to store measurements of historical sections of the environment relative to the system; and a processor coupled to the sensor and configured to calculate navigation parameters based on signals received from the sensor. Further, the processor is configured to convert the signals received from the sensor into a current evidence grid and remove data from the current evidence grid to form a reduced evidence grid; convert the measurements of historical sections into a historical evidence grid; and correlate the reduced evidence grid with the historical evidence grid by adjusting position and orientation of the reduced evidence grid and the historical evidence grid in relation to one another and calculating correlative values for each adjusted position and orientation, and searching for a highest correlative value, wherein the navigation parameters are calculated based on the adjusted position and orientation that yield the highest correlative value.

BRIEF DESCRIPTION OF THE DRAWINGS

These and other features, aspects, and advantages are better understood with regard to the following description, appended claims, and accompanying drawings where:

FIGS. 3-4 are diagrams illustrating the reduction of size for evidence grids according to one embodiment;

FIG. 5-8 are diagrams illustrating the searching of evidence grids for the highest correlative value according to one embodiment.

In accordance with common practice, the various described features are not drawn to scale but are drawn to emphasize features relevant to the present invention. Like reference characters denote like elements or components throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments described in the present disclosure provide for systems and methods for correlating evidence grids by reducing the memory consumed by the evidence grids and by implementing different correlative methods to cross correlate different evidence grids. To reduce the memory consumed by an evidence grid, the evidence grid can be processed to remove areas that represent empty space in the environment. Alternatively, the memory consumed by an evidence grid can be reduced by removing data that is not associated with edges of structures or other features of the environment. When the evidence grids are reduced in size, the reduced evidence grids can be cross correlated using different searching methods that can more efficiently cross correlate evidence grids based on the type of environment that are scanned to produce the evidence grids. The cross-correlation of evidence grids produces information describing the position and orientation difference of a navigation system between the different times that different evidence grids are created. The position and orientation difference can be used to determine navigation parameters for the navigation system. Further, the reduction in size of the evidence grids along with the implementation of different searching methods enables faster calculation of the correlation and subsequent navigation parameters, which allows the correlation of the evidence grids to be used more frequently as a source of navigation data for a navigation system.

Figure 1:
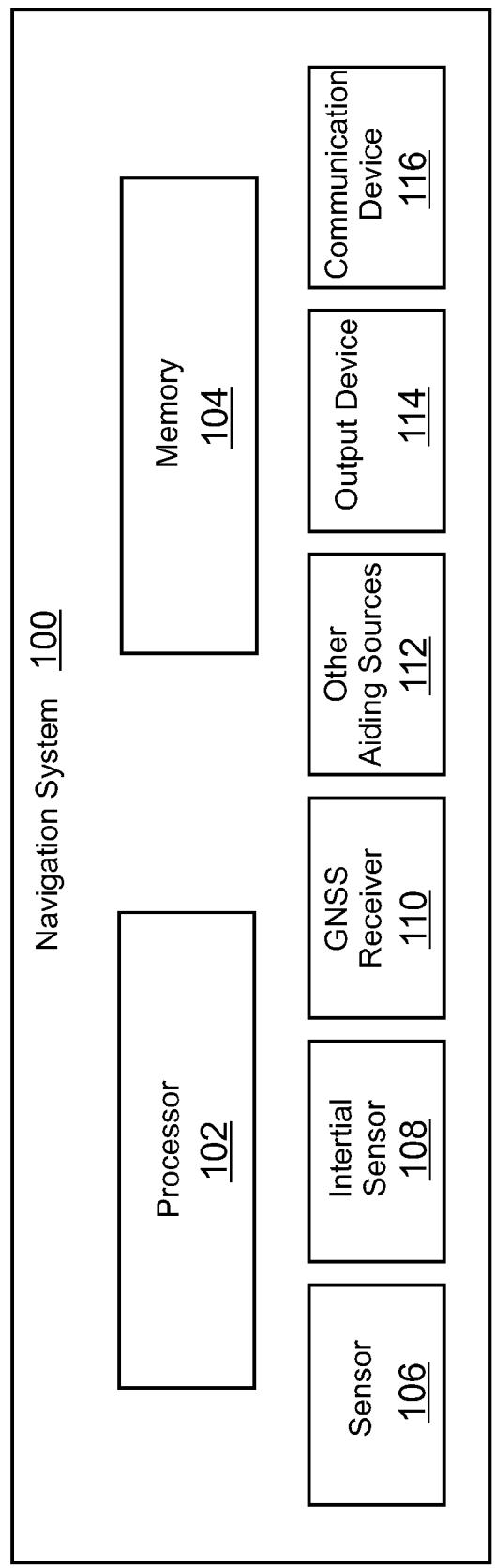
FIG. 1 is a block diagram of a navigation system implementing evidence grid correlation according to one embodiment.

FIG. 1 is a block diagram depicting an exemplary embodiment of a navigation system 100 implementing evidence grid correlation for ground navigation. Exemplary navigation system 100 includes a processor 102, memory 104, and a sensor 106. In some embodiments, the navigation system 100 also includes one or more optional inertial sensors 108, a global navigation satellite systems (GNSS) receiver 110 (for example, a global positioning system (GPS)), other aiding sources 112, and an output device 114. While the system is described for use in ground navigation of a vehicle, person, or other object, the system can be used in air vehicle navigation (e.g. military helicopter navigation, commercial aircraft navigation), sea, or space navigation as well.

In exemplary embodiments, sensor 106 is operable to produce signals that contain both range and angle information for a plurality of objects in an environment. For example, sensor 106 is a light detection and ranging (LiDAR) sensor. Alternatively, sensor 106 is a radio detection and ranging (RADAR) sensor, a sound navigation and ranging (SONAR) sensor, or other sensors capable of measuring range and attitude of objects within the environment of the sensor, such as other electromagnetic or acoustic ranging sensors and communicating a signal to a processor, where the signal contains the range and angle measurements of the objects within the environment. For example, when an environment, scanned by the sensor 106, contains N objects, the signal contains N range measurements and 2N angle measurements of the lines between the sensor 106 and the N objects.

In exemplary embodiments, where sensor 106 is a LiDAR sensor, sensor 106 includes a plurality of laser and photodetector pairs (such as 64 pairs) mounted vertically and directed at various angles (various azimuths). In at least one exemplary implementation, the vertically mounted lasers of the LiDAR sensor scan an environment by spinning around a vertical axis. For example, the vertically mounted lasers can spin around at a rate of ten times per second. The light emitted from the lasers reflects off of objects in the environment and is received by the photodetectors. The time between emission from the laser and reception at the photodetector and the position of the photodetector that receives the reflected light is used to calculate the range and angle measurements of the object that reflected the light. In at least one exemplary embodiment, the sensor 106 outputs raw sensor data describing the environment in polar coordinates.

In exemplary embodiments, memory 104 stores the raw sensor data received from the sensor 106. In at least one implementation, the processor 102 converts the raw sensor data from polar coordinates to Cartesian coordinates. Alternatively, the conversion from polar coordinates to Cartesian coordinates is done by an element other than the processor 102 in navigation system 100. For example, a separate processor or the LIDAR sensor 106 itself can convert polar coordinates to Cartesian coordinates. In other exemplary embodiments, no polar to Cartesian conversion is performed and the subsequent calculations are performed using polar coordinates. In exemplary embodiments, the coordinates (polar or Cartesian) are stored in memory 104.

In certain embodiments, processor 102 creates evidence grids from the raw sensor data. An evidence grid is a three-dimensional collection of cells or voxels, where each voxel has an associated probability that the cell is occupied (probability of occupancy) by a feature in the scanned environment. Processor 102 generates both historical evidence grids and current evidence grids from data stored in memory 104 and environmental measurements received from sensor 106.

In certain implementations, the evidence grids created from the raw data received from sensor 106 contain significant amounts of data. For example, sensor 106 can provide data that describes a three dimensional evidence grid that is 300×300×100. An evidence grid of this size can consume approximately 10 MB of memory. Further, the historical evidence grid can be even larger because the historical evidence grid contains data that is built from multiple previously acquired evidence grids. For instance, a historical evidence grid can have dimensions of 1000×1000×100, which can consume roughly 100 MB of memory. Processor 102 can correlate the probabilities of occupancy for the voxels of the current evidence grid with the probabilities of occupancy for the voxels of the historical evidence grid to determine the current location of the navigation system 100. However, due to the size of the evidence grids, correlating the current evidence grid with the historical evidence grid can take substantial amounts of time.

To decrease the amount of time required for the correlation of the current evidence grid with the historical evidence grid, the processor 102 reduces the amount of data, stored in memory 104, that is associated with both the current and historical evidence grids. In at least one embodiment, to reduce the amount of data associated with each evidence grid, the processor 102 removes data associated with voxels that have a probability of occupancy less than a predefined threshold. Alternatively, the processor reduces the amount of data associated with each evidence grid by removing data associated with voxels that have a probability of occupancy substantially similar to neighboring voxels. Processor 102 reduces the size of a current evidence grid to create a reduced evidence grid. Also, processor 102 reduces the size of a historical evidence grid to create a reduced historical evidence grid.

In certain embodiments, when the processor 102 creates the reduced evidence grid and the reduced historical evidence grid, processor 102 correlates the reduced evidence grid with the reduced historical evidence grid. Even though the memory consumed by the reduced evidence grid and the reduced historical evidence grid is significantly less than the memory consumed respectively by the current evidence grid and the historical evidence grid, the correlation of the reduced evidence grid with the reduced historical evidence grid can take significant amounts of time. Specifically, to correlate different evidence grids, one evidence grid is rotated or translated through six degrees of freedom and correlative values are calculated for the positions of the different evidence grids in relation to one another. The relative positions of the different evidence grids that provide the highest correlative value are used to calculate the position of the navigation system 100 at the time the current evidence grid was acquired in relation to the historical evidence grid.

In certain embodiments, the evidence grids are adjusted through six degrees of freedom in relation to one another. Even with the reduced size of the evidence grids, correlating the reduced evidence grid with the reduced historical evidence grid can consume a large amounts of time. For example, processor 102 can perform a global search, where a global search correlates different evidence grids through every different relative position in a range of values in each degree of freedom. A global search performed through a range of 41 values in each degree of freedom that checks all possible relative positions of two different evidence grids in relation to one another would require 41^6 (about 5 billion) different evidence grid comparisons. Thus, the large number of different comparisons made in a global search can be too expensive in regards to the amount of processing time required to perform the calculations. To decrease the amount of time used to correlate the reduced evidence grid with the reduced historical evidence grid, the processor 102 may utilize searching algorithms other than a global search.

In at least one implementation, the processor 102 sequentially searches for the different relative positions and orientations that produce the highest correlative value for two different evidence grids. When performing a sequential search, the processor 102 adjusts the position and orientation of the reduced evidence grid and the reduced historical evidence grid in relation to one another along the individual degrees of freedom in the six degrees of freedom. For example, when the processor 102 is performing a sequential search along three coordinate axes, the processor 102 shifts a reduced evidence grid along a first axis in the coordinate axis to find the position along the first axis that has the highest correlation value with the reduced historical evidence grid. When the processor 102 identifies the position along the first axis with the highest correlation value, the processor 102 shifts the reduced evidence grid along the second axis at the position in the first axis that has the highest correlative value to find the position along the second axis that has the highest correlation value. Subsequently, the processor 102 shifts the reduced evidence grid along a third axis, at a position having the highest correlation value along the first and second axis, until the processor 102 identifies the position along the third axis with the highest correlation value. Further, the processor 102 performs similar sequential adjustments to the orientation of the reduced evidence grid about the three coordinate axes. In certain embodiments, the value that is identified by the sequential search yields the highest correlation value for the evidence grids, and hence an estimate for navigational parameters of the navigation system based on the adjustments to the position and orientation of the reduced historical evidence grid and the reduced evidence grid, where the navigational parameters contain information describing the position and attitude of the navigation system. However, in certain embodiments, a sequential search may not find the best correlation value for two different evidence grids.

In an alternative embodiment, the processor 102 performs a segmented sequential search. The processor 102 performs a segmented sequential search by dividing the different evidence grids into segments and performing a sequential search on the different segments. In at least one implementation, the processor 102 identifies the coordinate axes of a feature in a segment of an evidence grid and adjusts the orientation and position of the segment to align the coordinate axes of the feature with the coordinate axes of the evidence grid. The processor 102 sequentially searches the segments that have been adjusted. A segmented sequential search increases the chance of finding the highest correlative value for different evidence grids when axes of features in the environment fail to be aligned with each other or with the axes of the evidence grid. In certain embodiments, the processor 102 determines whether to perform a global search, a sequential search, or a segmented sequential search based on the type of environment that contains the navigation system 100.

In at least one embodiment, the processor 102 correlates evidence grids that contain data that is produced by the sensor 106, where the data is produced from scans of at least three different landscape types. The three different landscape types include a natural terrain environment, an urban environment, and a suburban environment. The natural terrain environment is a landscape defined by hills or mountains, and may also include sparse buildings. In the natural terrain environment, a sequential search can find the largest correlative value if the reduced evidence grid is substantially similar to the reduced historical evidence grid. However, in a natural terrain environment, a sequential search can miss the relative positions of the reduced evidence grid and the reduced historical evidence grid that yields the largest correlative value. When a sequential search fails to yield a correlated position representing the largest correlative value, a global search or sequential global search can be performed to find the relative position of the evidence grids that yields the largest correlative value. Alternatively, the processor 102 uses the Jacobian and the Hessian of the evidence grids to aid in performing a sequential search. For example, the Jacobian and the Hessian can provide information describing the rate of change of the correlative values for the different evidence grids that can provide directional information when trying to find the highest correlative value.

As stated above, the landscape can also describe an urban environment, where an urban environment is an environment containing the edges of buildings that are arranged along two perpendicular directions. A sequential search can generally find the relative position of different evidence grids that yields the largest correlative value when the sequential search axes are aligned with the building edges. In certain implementations, the building edges may not be aligned with the sequential search axes. When the building edges are not aligned with the sequential search axes, a sequential search may not locate the highest correlative value. Thus, the processor 102 may either adjust the orientation and position of the evidence grid or the sequential search axes so that the building edges are aligned with the sequential search axes.

A third landscape can also describe a suburban environment. The suburban environment is generally marked by curving roads and buildings that are not aligned with each other. Due to the characteristics of a suburban environment, it is difficult to align sequential search axes with the building edges that are aligned along different non-perpendicular axes. In a suburban environment, the processor 102 can perform a segmented sequential search, where the building edges or other features in a segment are aligned with the sequential search axes in their respective segment. Further, processor 102 uses the Jacobian and Hessian as described above for the evidence grids to assist in the sequential search. Using different search methods for correlating the reduced evidence grids aids the processor in finding the relative position of the reduced evidence grid and the reduced historical evidence grid that produces the largest correlative value while reducing the amount of processing needed to find the largest correlative value.

In exemplary embodiments of navigation system 100 having inertial sensors 108, inertial sensor data from the inertial sensors 108 relevant to the current attitude of the navigation system 100 is used to compensate for tilting or rotation of the system 100 and sensor 106 during operation. Thus, the system 100 can compensate for tilting and rotation of the system 100 and sensor 106 as the system 100 moves across terrain (while on a vehicle, on an object, or attached to a person) that affects the attitude of the sensor 106 with respect to the ground.

In exemplary embodiments having other navigation and aiding sources, such as one or more optional inertial sensors 108, optional GNSS receiver 110, and optional other aiding sources 112, the location based on the navigation parameters that were calculated based on the data acquired from correlation of the evidence grids produced from signals from sensor 106 is fused with location data from the other navigation and aiding sources using a Kalman filter, Extended Kalman Filter (EKF), or other appropriate state estimator or data fusion algorithm or technique. In exemplary embodiments, the Kalman filter estimates and corrects errors in the navigation solution based on the navigation parameters derived from the signals produced by the sensor 106, the one or more optional inertial sensors 108, the GNSS receiver 110, and the optional other aiding sources 112. In at least one embodiment, when processor 102 performs a sequential search of a reduced evidence grid and a reduced historical evidence grid, the sequential search is limited to values within the possible error range of the navigation solution calculated using the Kalman filter.

In certain embodiments, the processing unit 102 includes or functions with software programs, firmware or other computer readable instructions for carrying out various methods, process tasks, calculations, and control functions, used in the implementing the functionality described above. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CDROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, an output device 114 outputs a navigation solution calculated by the processor 102 to a user interface. In further exemplary embodiments, communication device 116 communicates the navigation solution with another system or device by transmitting data representing the navigation solution to the other system or device through a communication data link.

Figure 2:
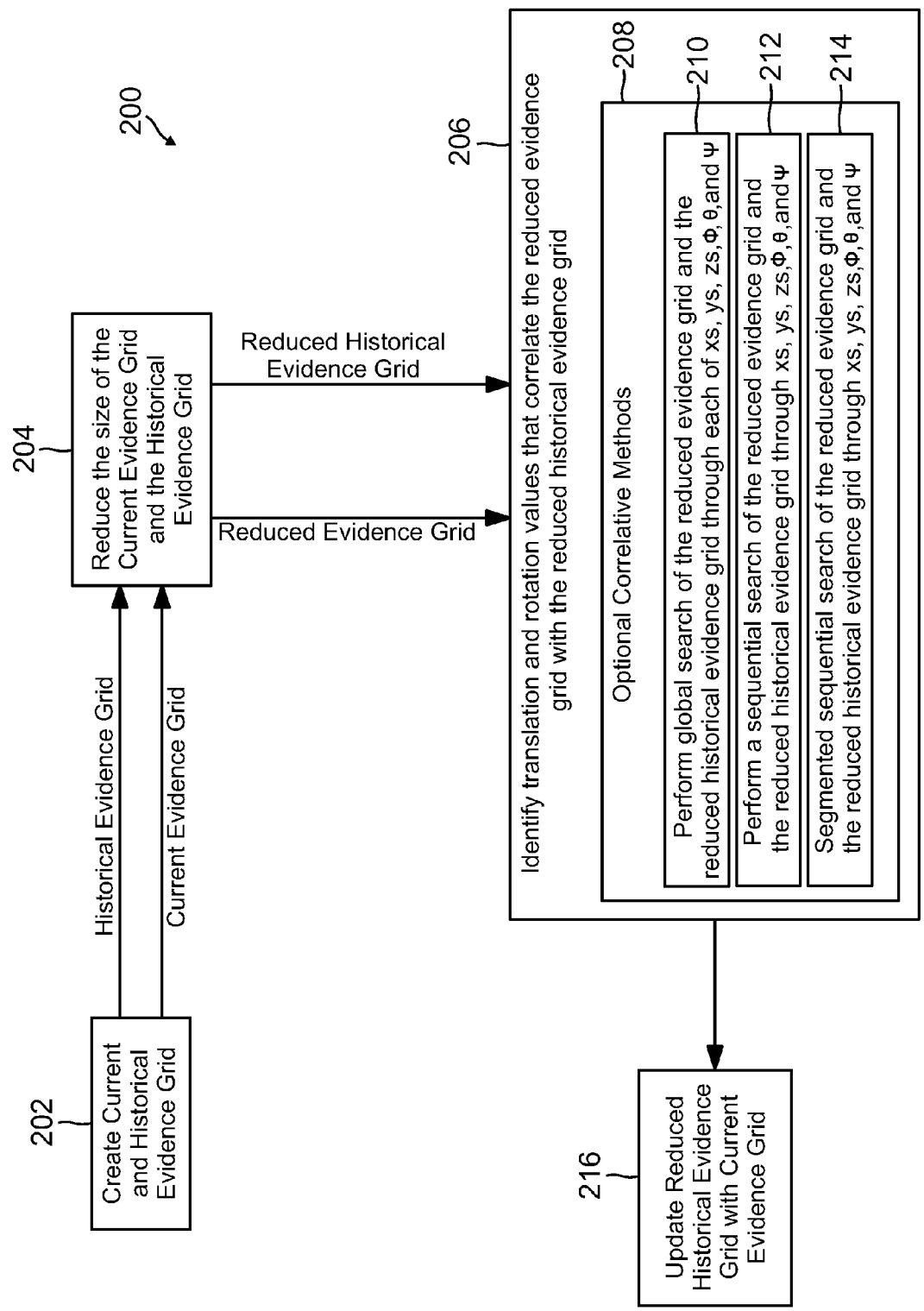
FIG. 2 is a flow diagram of a method for performing evidence grid correlation according to one embodiment.

FIG. 2 is a flow diagram of a method 200 for using data acquired from a sensor to calculate position and attitude estimates for a navigation system. The method 200 begins at 202, where a current evidence grid and a historical evidence grid are created. In at least one embodiment, the current evidence grid is created by scanning an environment with a LiDAR or other sensor. In one embodiment, the sensor returns data for each voxel of the scanning volume. For example, the sensor returns a "1" if the scanner encountered an object in the volume associated with the voxel or a 0 if the scanner did not find an object within the volume associated with the voxel. In certain implementations, the scanner takes multiple measurements of the environment and averages the measurements together. The navigation system then compiles the average for the multiple measurements to create an evidence grid that describes a probability that a volume in the scanned environment is occupied by an object.

In at least one exemplary embodiment, to create the historical evidence grid, the navigation system acquires data from memory, where the data is a compilation of multiple evidence grids that were previously acquired. The current evidence grid can be compared against the historical evidence grid to determine the current position of the navigation system.

As described above, the current and historical evidence grids can consume large amounts of memory, which may cause future calculations that use the evidence grids to be unwieldy due to the size of the evidence grids. Due to the large size of both the current and historical evidence grids, method 200 proceeds at 204 where the size of the current evidence grid and the historical evidence grid are reduced. As discussed above, the size of the evidence grids can be reduced by removing data from the evidence grid, where the data that is removed has a small impact on the correlation of the different evidence grids with one another. As described above, data can be removed that has a probability of occupancy less than a predefined threshold. Alternatively, the processor reduces the amount of data associated with each evidence grid by removing data associated with voxels that have a probability of occupancy substantially similar to neighboring voxels.

Figure 3:
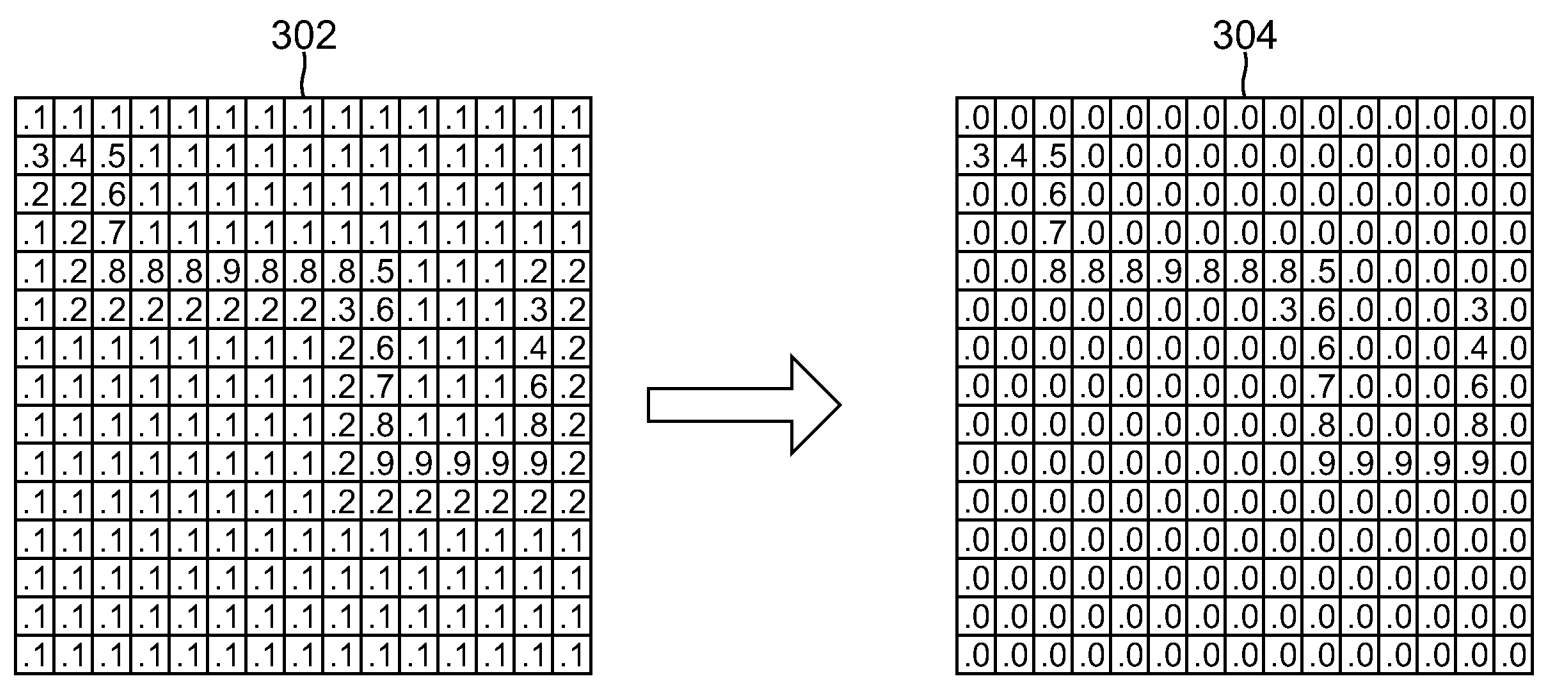

FIG. 3 is a diagram illustrating an evidence grid 302 and a reduced evidence grid 304 based on the evidence grid 302, where the reduced evidence grid 304 is created by comparing the probability of occupancy for the different voxels of the evidence grid 302 against a threshold. For example, to create the reduced evidence grid 304 from evidence grid 302, the probability of occupancies for the separate voxels in evidence grid 302 are compared against a threshold probability of occupancy of 0.3. If the value for a voxel in evidence grid 302 is less than the threshold probability of occupancy, then the data is removed from the evidence grid 302 to form the reduced evidence grid 304. Generally, the data remaining in the reduced evidence grid represents a two-dimensional curved surface in a three-dimensional space. In at least one example, an evidence grid 302 contains data representing a volume with 300×300×100 voxels. After the reduction of evidence grid 302 to form reduced evidence grid 304, the same data is represented by 300×300×5 voxels, where 5 is the typical maximum number of two-dimensional surface sheets above any point in the 300×300 horizontal pixels.

Figure 4:
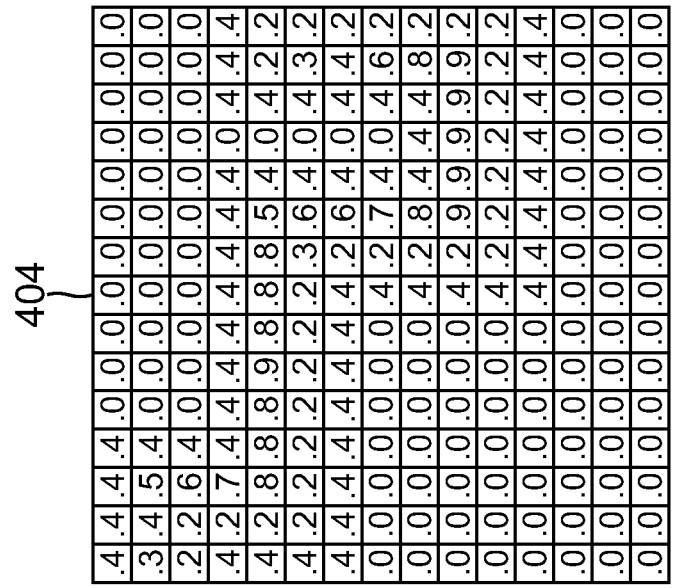
Figure 4:
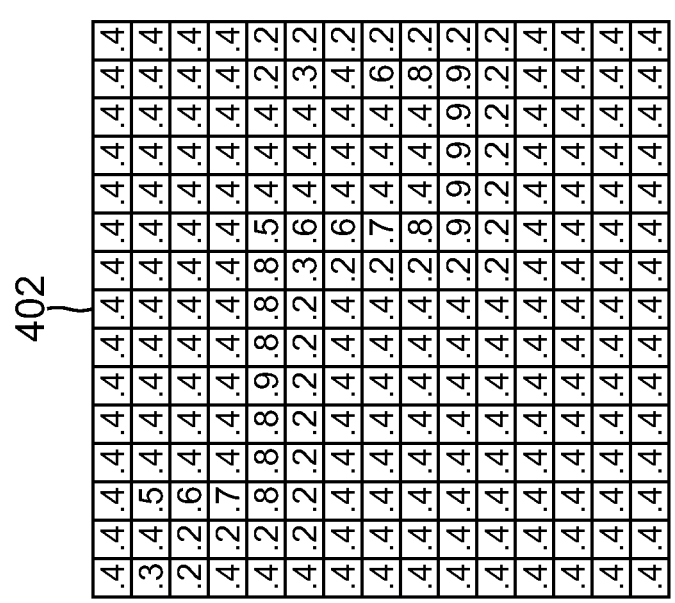

In an alternative implementation to comparing the probability of occupancy for the separate voxels against a threshold probability of occupancy, data can be removed for voxels that have a probability of occupancy that is similar to the probability of occupancy for neighboring voxels. FIG. 4 is a diagram illustrating an evidence grid 402 and a reduced evidence grid 404 based on the evidence grid 402, where the reduced evidence grid 404 is created by removing data for voxels that is similar to the data contained in neighboring voxels. For example, when implemented as shown in evidence grid 402 and reduced evidence grid 404, data representing a probability of occupancy that is within a range of each of its neighbors is removed from the evidence grid 402 to form the evidence grid 404. By removing data from voxels that is substantially similar to the data in neighboring voxels, the navigation system can reduce the size of the evidence grid. For example, the reduced evidence grid can be stored as an efficient data structure such as a sparse matrix.

In certain embodiments, the historical evidence grid is segmented based on the orientation of objects represented within the historical evidence grid. For example, when a first set of grouped objects represented within the historical evidence grid are aligned along a first coordinate axes and a second set of grouped objects represented within the historical evidence grid are aligned along a second coordinate axes, where the first and second coordinate axes are not aligned with one another, the historical evidence grid is segmented into a first segment containing the first set of grouped objects and a second segment containing a second set of grouped objects. The objects within the first segment are aligned along the same axes and the objects within the second segment are aligned along the same axes.

Returning to FIG. 2, method 200 proceeds at 206 where translation and rotation values that correlate the current evidence grid with the historical evidence grid are identified. To correlate the evidence grid with the historical evidence grid, an optional correlative method 208 is used. The optional correlative methods are represented by 210, 212, and 214. When method 200 proceeds to 210, a global search is performed of the current evidence grid and the historical evidence grid through each of xs, ys, zs, $\Phi$, $\theta$, and $\Psi$. For example, a global search correlates the reduced evidence grid with the reduced historical evidence grid over the different translations along the x, y, and z, axes and over the different rotations about the x, y, and z axes. The global search yields a translational shift value along the x, y, and z, axes noted herein as xs, ys, and zs and a rotational shift value about the x, y, and z axes noted herein as angles $\Phi$, $\theta$, and $\Psi$. The translational shift values xs, ys, and zs indicate the translational values that align the reduced evidence grid with the reduced historical evidence grid and the angles $\Phi$, $\theta$, and $\Psi$ indicate the rotational angles through which the reduced evidence grid is rotated to align the reduced evidence grid with the reduced historical evidence grid. As described above, a global search will find the values for xs, ys, zs, $\Phi$, $\theta$, and $\Psi$ within a range of possible values for xs, ys, zs, $\Phi$, $\theta$, and $\Psi$ that yield the highest correlative value. However, the global search can be computationally intensive.

Optionally, method 200 proceeds to 212, where a sequential search of the reduced evidence grid and the reduced historical evidence grid is performed through xs, ys, zs, $\Phi$, $\theta$, and $\Psi$. As described above, the sequential search separately and sequentially shifts the reduced evidence grid and the reduced historical evidence grid in relation to one another along or about the different axes to find values for xs, ys, zs, $\Phi$, $\theta$, and $\Psi$. For example, when performing a sequential search to find xs, ys, and zs, the reduced evidence grid is shifted along the x axis at a fixed position in both the y axis and the z axis to find a relative position for the reduced evidence grid and the reduced historical evidence grid that yields the highest correlative value. The distance between the original position of the reduced evidence grid and the position of the reduced evidence grid along the x axis that produces the highest correlative value is the translational shift xs. When xs is calculated, the reduced evidence grid is shifted along the y axis at a fixed position in both the x axis and the z axis, where the fixed position in the x axis corresponds to the translational shift xs. The reduced evidence grid is shifted to find a relative position for the reduced evidence grid and the reduced historical evidence grid that yields the highest correlative value. The distance between the original position of the reduced evidence grid along the y axis and the position of the reduced evidence grid along the y axis that produces the highest correlative value is the translational shift ys. When xs and ys are calculated, zs is calculated in a similar manner by shifting the reduced evidence grid along the z axis. Subsequently, $\Phi$, $\theta$, and $\Psi$ are also calculated in a similar manner. In certain embodiments, the values xs, ys, zs, $\Phi$, $\theta$, and $\Psi$, identified by sequentially searching the reduced evidence grid and the reduced historical evidence grid, yields the highest correlation value for the evidence grids, and hence an estimate for the position of a navigation system based on xs, ys, zs, $\Phi$, $\theta$, and $\Psi$ can be calculated based on the correlation of the reduced evidence grid and the reduced historical evidence grid. However, in certain embodiments, a sequential search may not find the xs, ys, zs, $\Phi$, $\theta$, and $\Psi$ that produce the highest correlation value between the reduced evidence grid and the reduced historical evidence grid.

In an alternative embodiment of a sequential search, the search can start at a previous best estimate of the shifts (for example the location[x0,y0,z0]) then search in the x direction for the highest correlation value along the line [x0+xs, y0,z0]. Then begin again at [x0,y0,z0] and search in the y direction for the highest correlation value along the line [x0, y0+ys,z0]. Then begin again at [x0,y0,z0] and search in the z direction for the highest correlation value along the line [x0, y0,z0+zs]. The final result will be at the point, [x0+xs, y0+ys,z0+zs], which is independent of the order that the three axes are searched in.

In another alternative search, method 200 proceeds to 214, where a segmented sequential search of the reduced evidence grid and the reduced historical evidence grid is performed over xs, ys, zs, $\Phi$, $\theta$, and $\Psi$. As described above in relation to FIG. 1, when performing a segmented sequential search the reduced evidence grid and the reduced historical evidence grid are divided into segments and the different segments are then sequentially searched. In at least one implementation, features identified in segmented portions of the evidence grids are aligned with the sequential search axes before the segments are sequentially searched.

In certain embodiments, when method 200 performs 208, the quickest correlative method is attempted, where the sequential search is the quickest correlative method and the global search is the slowest correlative method. To ensure that the correlative method performed determines the highest correlative value between the reduced evidence grid and the reduced historical evidence grid, multiple checks can be performed. For example, when a sequential search identifies a position having the highest correlation values, a series of neighborhood correlative positions that are near the position associated with the acquired highest correlation value can be checked. If any of the neighborhood correlative positions yields a correlation value that is higher than the acquired highest correlation value, the sequential search failed and a different correlation method can then be attempted, where the different correlation method has a higher probability of correctly identifying the relative position of the reduced evidence grid and the reduced historical evidence grid that yields the highest correlative value. In a further embodiment, features can be identified in the frame to determine the search method that is most likely to yield the highest correlative value with a reduced computational impact. In at least one implementation, the Jacobian and Hessian are calculated for the reduced evidence grid and the reduced historical evidence grid. The Jacobian and Hessian are used to aid in determining the highest correlative value for the reduced evidence grid and the reduced historical evidence grid. Also, in addition to the Jacobian and Hessian methods, to speed up the search process, a simulated annealing method can be used to avoid local optimal solutions and achieve a global optimal solution.

In at least one implementation, the reduced evidence grid is compared with a segment of the reduced historical evidence grid. As described above, in certain implementations, the reduced historical evidence grid or the historical evidence grid is segmented into different segments, where each segment contains objects that are aligned along the same coordinate axes. The reduced evidence grid can be correlated with a segment where the objects in the segment and the objects in the reduced evidence grid are aligned along similar coordinate axes. Limiting the search size of the reduced historical evidence grid can accelerate the correlation process.

When method 200 identifies translation and rotation values that correlate the reduced evidence grid with the reduced historical evidence grid, the method 200 updates the reduced historical evidence grid with a current evidence grid. As stated above, the historical evidence grid is a compilation of previously acquired evidence grids. Once the reduced evidence grid has been correlated with the reduced historical evidence grid, the reduced evidence grid is incorporated into the reduced historical evidence grid such that the reduced historical evidence grid contains the most recent measurements for subsequent comparisons with subsequently acquired evidence grids. In one implementation the current evidence grid from which the reduced evidence grid is derived is used to update the historical evidence grid.

FIGS. 5-8 are examples of searching methods used for searching evidence grids acquired in different environments. For example, data used to create evidence grids can be acquired from different environment types. The different environment types include an urban environment, a suburban environment, and a natural terrain environment. As described previously, the urban environment is an environment containing buildings that are arranged along two perpendicular directions. The suburban environment is an environment having curved roads and buildings that are not aligned with each other. The natural terrain environment is a landscape defined by hills or mountains, and may also include sparse buildings. The type of environment can dictate which search methods are likely to be most effective for correlating evidence grids acquired from measurements of the environments. Further, while the examples illustrated in FIGS. 5-8 are two-dimensional, one having skill in the art would recognize that the description of the searches can be extended to three-dimensions having six degrees of freedom.

Figure 5:
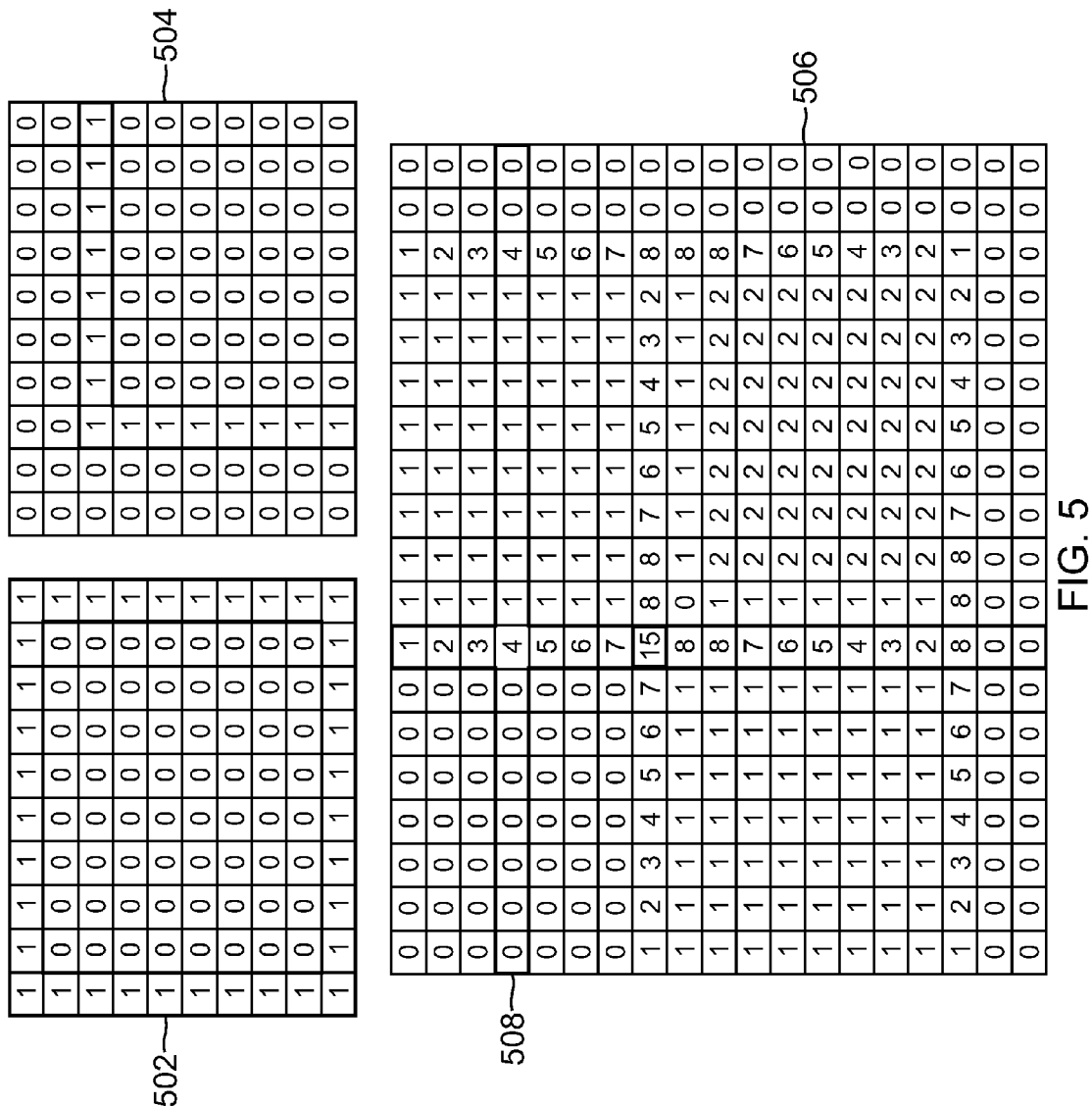
Figure 6:
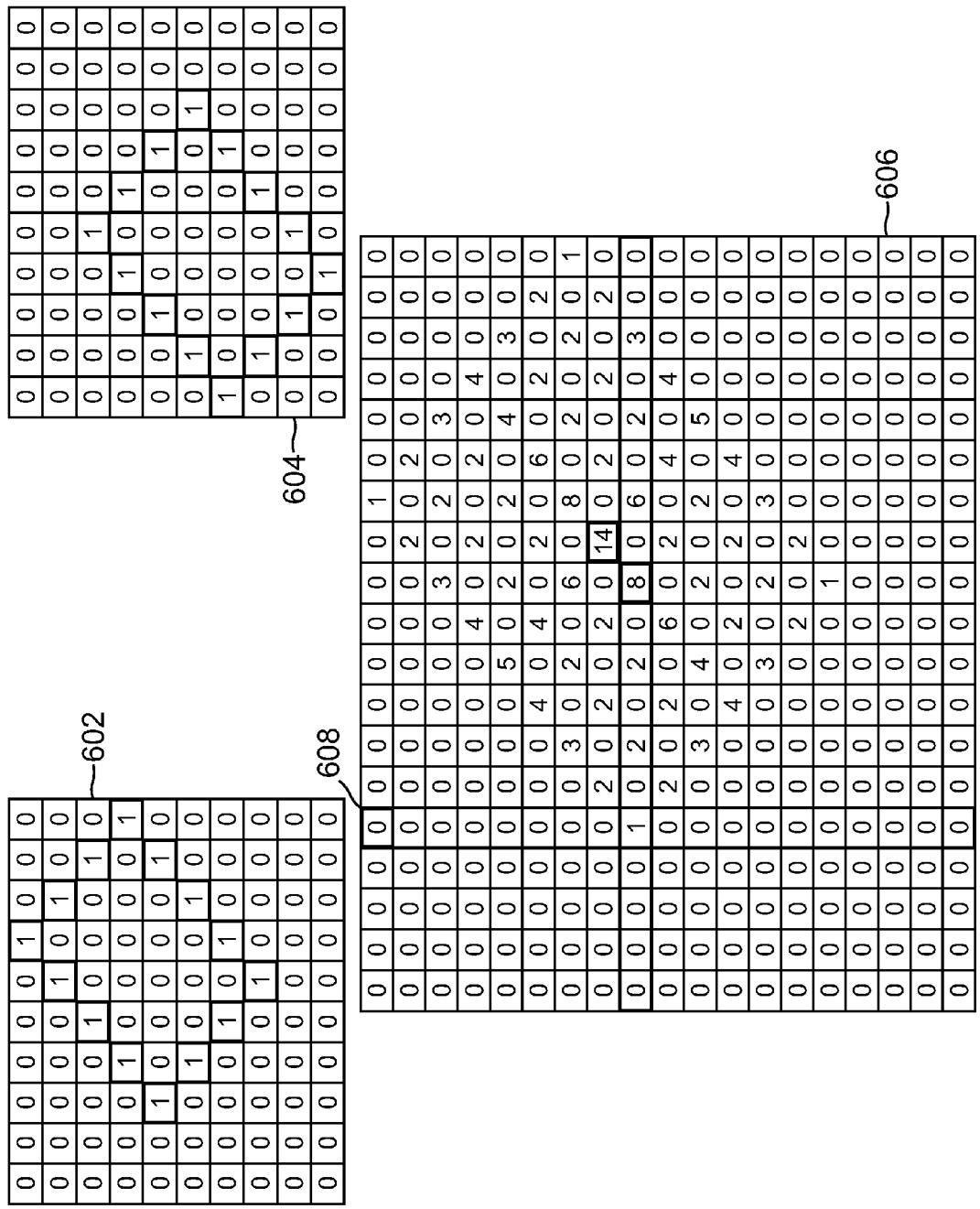

FIGS. 5 and 6 are examples of evidence grids acquired from an urban environment. In particular, FIG. 5 illustrates a reduced evidence grid 502, a reduced historical evidence grid 504, and a correlation grid 506, where the correlation grid 506 represents the possible correlation values that result from the cross correlation of reduced evidence grid 502 with reduced historical evidence grid 504 over all possible correlation values for translations along two perpendicularly oriented axes. As shown in FIG. 5, both reduced evidence grid 502 and reduced historical evidence grid 504 represent environments having edges arranged along perpendicular axes that are aligned with the sequential search axes. When the sequential search axes are aligned with perpendicular edges, a sequential search along the perpendicular axes is likely to find the highest correlative value. For example sequential search 508 (i.e. the search that begins at pixel 508) searches horizontally through reduced evidence grid 502 and reduced historical evidence grid 504 and encounters a "4" as the highest correlative value in the horizontal axis. After finding the highest value along the horizontal axis, the sequential search 508 searches the vertical axis that intersects the horizontal axis at the highest correlative value in the horizontal axis. When the sequential search 508 searches the vertical axis containing the highest correlative value in the horizontal axis, the sequential search 508 encounters a value of "15" as the highest value in the vertical axis. The sequential search 508 then determines that the translations of the reduced evidence grid 502 and the reduced historical evidence grid 504 associated with the highest correlative value correspond to the movement of a vehicle that acquires the measurements of the environment, where the measurements are used to produce the evidence grids.

FIG. 6 illustrates a reduced evidence grid 602, a reduced historical evidence grid 604, and a correlation grid 606. Both reduced evidence grid 602 and reduced historical evidence grid 604 represent urban environments having edges arranged along perpendicular axes. However, in contrast to FIG. 5, both reduced evidence grid 602 and reduced historical evidence grid 604 represent edges that are not aligned with the sequential search axes of the respective evidence grid. When the sequential search axes are not aligned with the perpendicular edges of the environment, a sequential search along the perpendicular axes of the evidence grids can miss the highest correlative value in for the relative position between the reduced evidence grid 602 and the reduced historical evidence grid 604. For example sequential search 608 (i.e. the search that begins at pixel 608) searches along a vertical axis in the possible correlative values illustrated in the correlation grid 606 and encounters a "1" as the highest correlative value along the vertical axis. After finding the highest correlative value along the vertical axis, the sequential search 608 searches along a horizontal axis that intersects the vertical axis at the highest correlative value in the vertical axis. When the sequential search 608 searches the horizontal axis containing the highest correlative value in the vertical axis, the sequential search 608 encounters a value of "8" as the highest correlative value in the horizontal axis. The sequential search 608 then determines that the "8" is the highest correlative value for the relative position of the reduced evidence grid 602 to the reduced historical evidence grid 604. However, checking correlative values that neighbor the relative position found in sequential search 608 can help determine whether the sequential search 608 encountered the actual highest correlative value. By checking the neighboring correlation values, a higher value of "14" is encountered. The higher value indicates that the sequential search 608 failed to acquire the highest correlative value.

In certain embodiments, to acquire the correct highest correlative value for the reduced evidence grid 602 and the reduced historical evidence grid 604, the reduced evidence grid 602 and the reduced historical evidence grid 604 can be rotated so that the perpendicular edges in the both the reduced evidence grid and the reduced historical evidence grid align with the perpendicular sequential search axes, and then performing a sequential search similar to sequential search 508 in FIG. 5. In an alternative embodiment, the Jacobian and Hessian can be calculated for both the reduced evidence grid 602 and the reduced historical evidence grid 604. The Jacobian and Hessian can provide information about the rate of change at a particular location in the correlation grid 606, which rate of change information can aid in determining whether the highest correlative value has been found for a relative position of the reduced evidence grid 602 and the reduced historical evidence grid 604.

Figure 7:
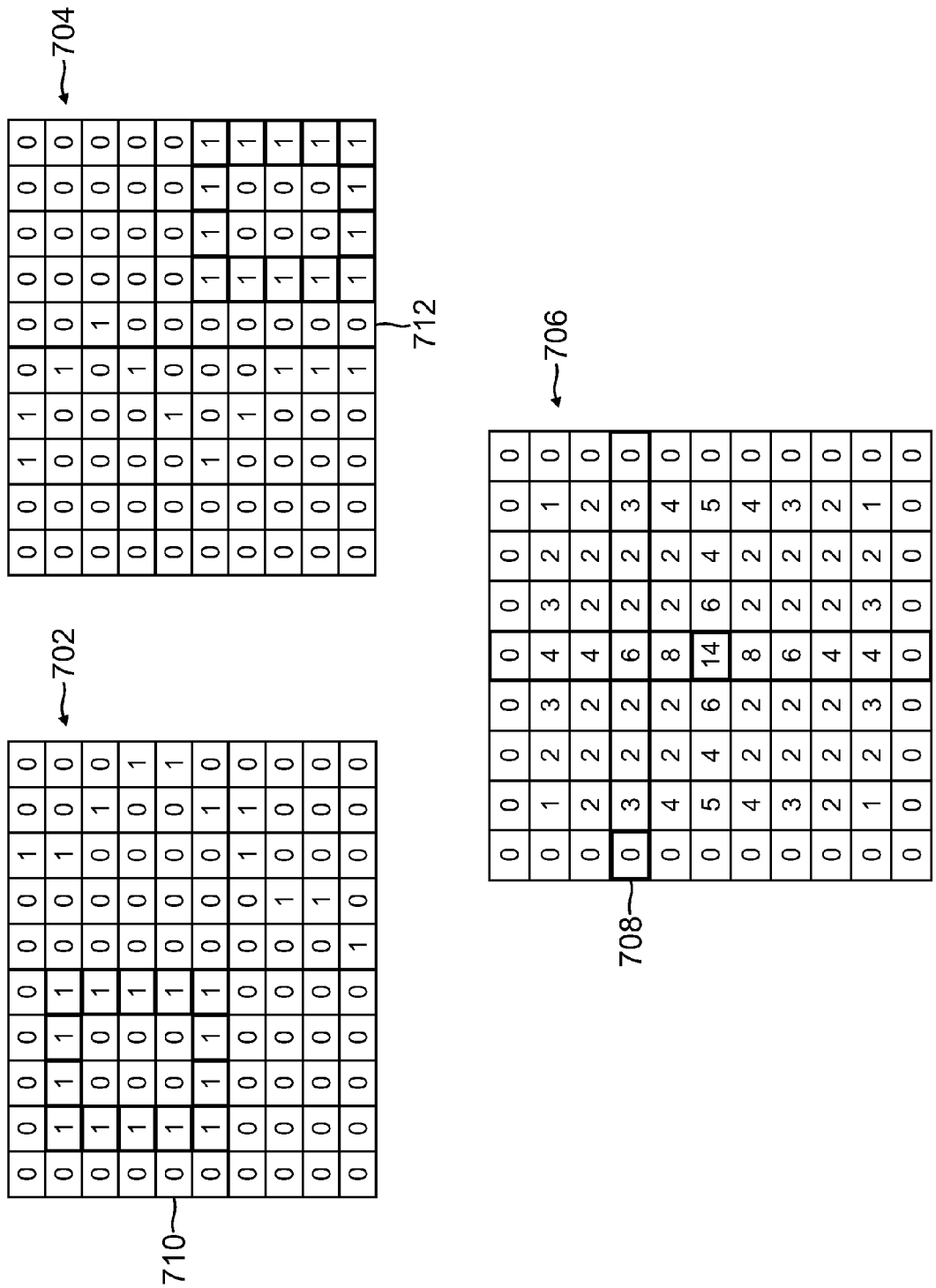

FIG. 7 illustrates a reduced evidence grid 702, a reduced historical evidence grid 704, and a correlation grid 706. Both reduced evidence grid 702 and reduced historical evidence grid 704 represent a suburban environment having curved roads and buildings that are not aligned with one other. Due to the misalignment of the different features measured in the environment, a sequential search performed using the entire reduced evidence grid 702 and the entire reduced historical evidence grid 704 may not encounter a correlative value that accurately indicates the change in position of the sensor acquiring the measurements that produced the evidence grids. To find the difference in position represented by the reduced evidence grid 702 and the reduced historical evidence grid 704, the different evidence grids are segmented for the performance of a segmented sequential search. For example, reduced evidence grid 702 is segmented into different segments, one of which includes current segment 710. Further, in at least some embodiments, reduced historical evidence grid is segmented into different segments, one of which includes historical segment 712. Alternatively, reduced historical evidence grid 704 is not segmented and the current segment 710 is searched against the entire reduced evidence grid 704. After segmentation, the segments can then be sequentially searched as shown in sequential search 708 in a manner similar to sequential search 508 in FIG. 5. For example, sequential search 708 searches along horizontal and vertical axes through the correlative values of current segment 710 with historical segment 712. Further, if the segments contain perpendicular edges that are not aligned with the perpendicular axes of the segment, the segment can be rotated so that the perpendicular axes of the segment align with perpendicular edges represented in the current segment 710.

FIG. 8 illustrates a reduced evidence grid 802, a reduced historical evidence grid 804, and a correlation grid 806. Both reduced evidence grid 802 and reduced historical evidence grid 804 represent a natural environment having rolling hills and mountains along with other natural features. Due to the non-perpendicular nature of a natural environment, a sequential search performed using the reduced evidence grid 802 and the reduced historical evidence grid 804 may not encounter a correlative value that accurately indicates the change in position of the sensor acquiring the measurements that produced the evidence grids. For example, sequential search 808 (ie the search that begins at pixel 808) fails to encounter the highest correlative value for the correlation of the reduced evidence grid 802 with the reduced historical evidence grid 804. To find the difference in position represented by the reduced evidence grid 802 and the reduced historical evidence grid 804, a global search can be performed for the possible correlations of the reduced evidence grid 802 with the reduced historical evidence grid 804. However, the correlations can also be limited to an error range of correlation values before performing the global search. For example, in performing the global search, the global search only calculates correlative values for the reduced evidence grid 802 and the reduced historical evidence grid 804 that are result in the correlative values within limited global search 810 in correlation grid 806. Further, the Hessian and Jacobian can also aid in finding the highest correlative value when using the global search. By implementing the different search methods described above, the highest correlative value between different evidence grids can be found while at the same time reducing the computational load of the correlative calculations.

Figure 9:
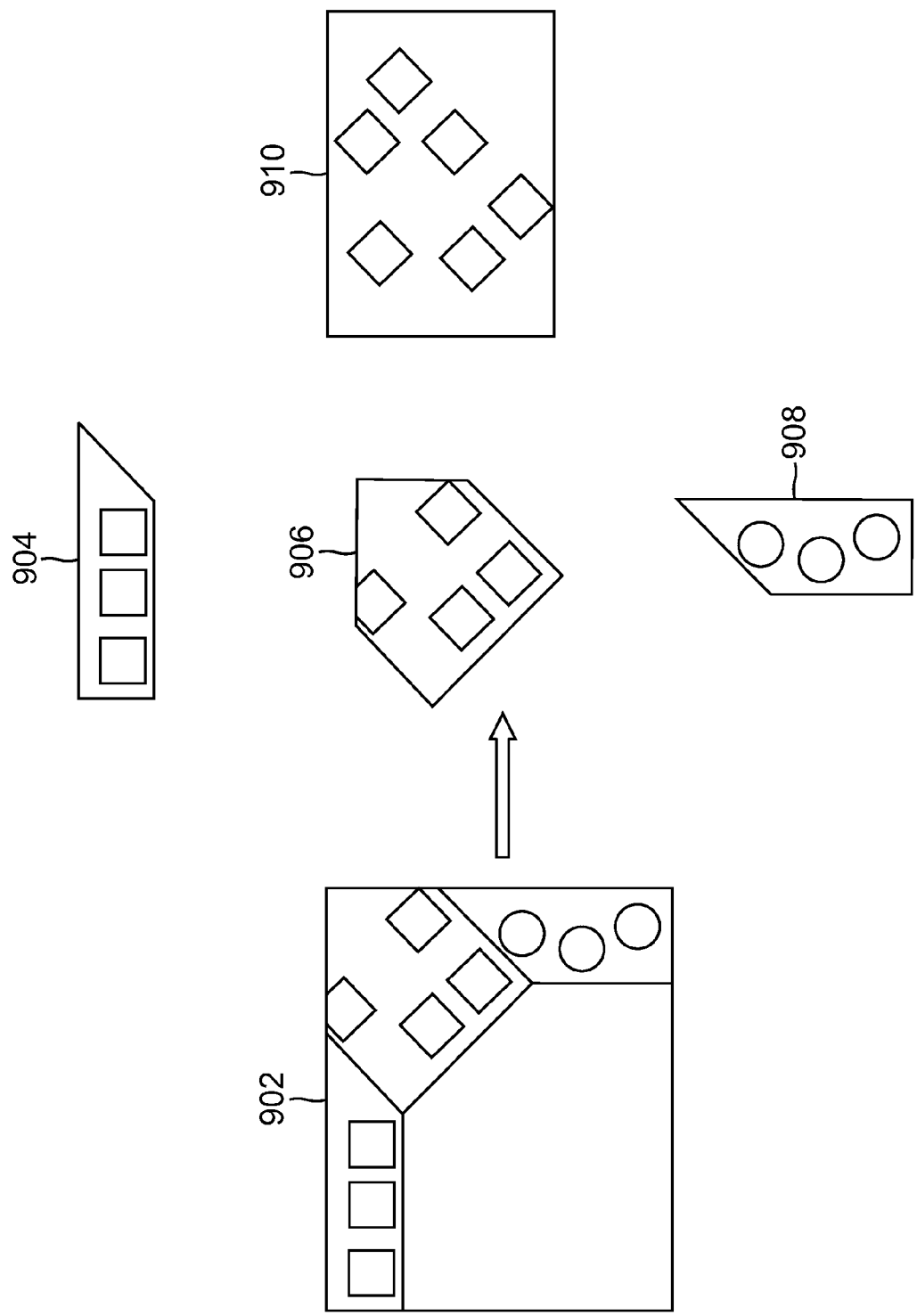
FIG. 9 is a diagram illustrating the segmenting of a historical evidence grid according to one embodiment.

FIG. 9 is a diagram illustrating the segmenting of a historical evidence grid 902 into different segments. For example, the historical evidence grid 902 can be segmented into a first segment 904, a second segment 906, and a third segment 908. The first segment 904 describes a first group of objects within historical evidence grid 902 that are aligned along a first coordinate axes. The second segment 906 describes a second group of objects within the historical evidence grid 902 that are aligned along a second coordinate axes, where the second coordinate axes is not aligned with the first coordinate axes. Similarly, the third segment 908 describes objects that are not aligned with objects described in either the first segment 904 or the second segment 906. When the historical evidence grid 902 is segmented into the first segment 904, the second segment 906, and the third segment 908, a reduced evidence grid 910 can be correlated with the segment describing objects that are most similarly aligned with objects described in the reduced evidence grid 910. For example, when the objects in reduced evidence grid 910 are aligned along the a similar coordinate axes as objects within the second segment 906, the reduced evidence grid 910 is correlated with second segment 906 using at least one search method described above.

Figure 10:
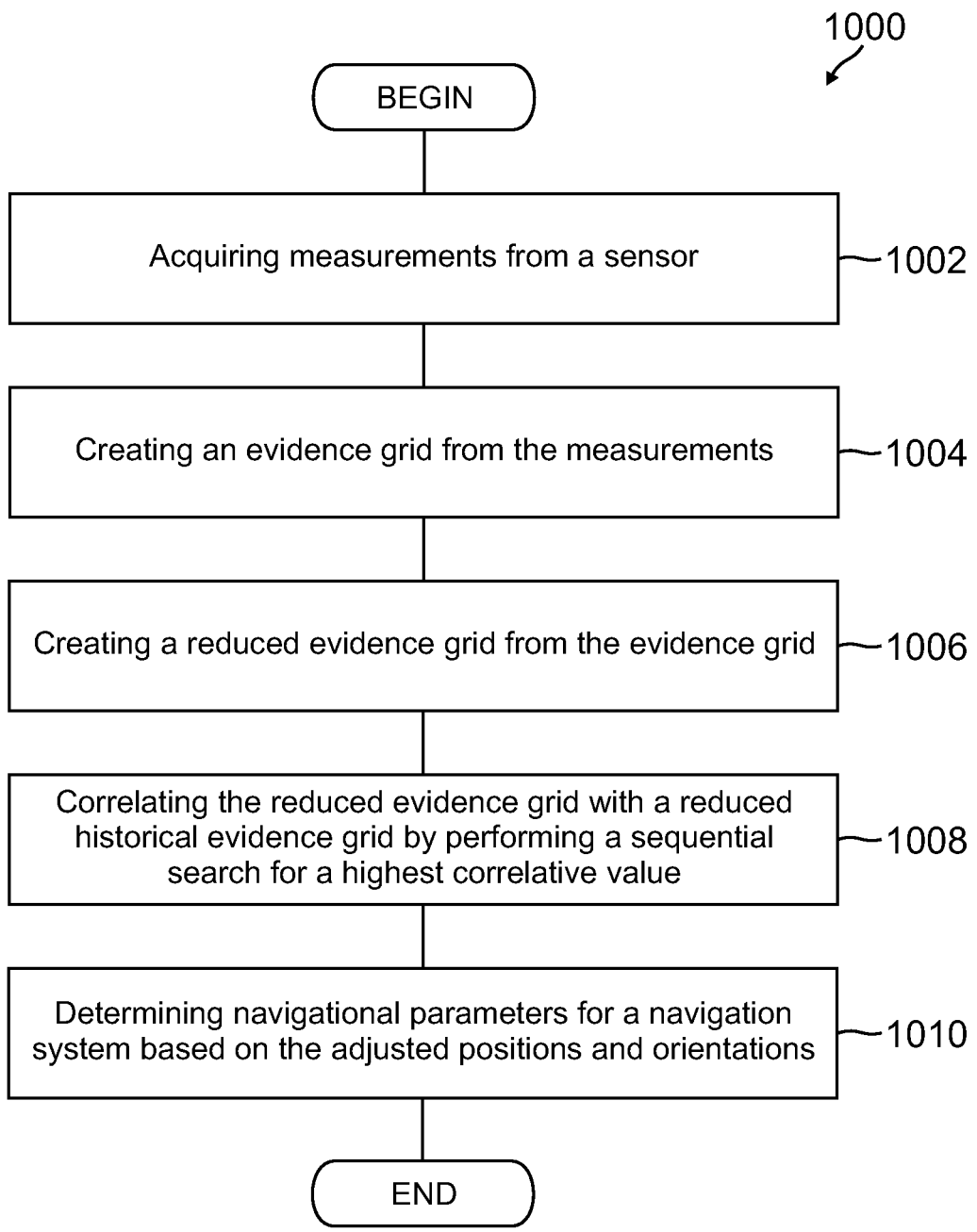
FIG. 10 is a flow diagram of a method for performing evidence grid correlation according to one embodiment.

FIG. 10 is a flow diagram of a method 1000 for correlating a current evidence grid with a historical evidence grid. Method 1000 begins at 1002 where measurements from a sensor are acquired. The measurement includes the vehicle's navigation information. Then the objective of using the correlation is to give correction on the navigation information. For example, a LiDAR or other ranging sensor acquires three-dimensional measurements of an environment containing the sensor. Method 1000 proceeds to 1004 where an evidence grid is created from the measurements. For example, a processor creates an evidence grid by mapping a three-dimensional grid to the environment based on the sensor measurements, where the grid comprises multiple pixels or voxels. Each voxel or pixel corresponds to a location in the environment and the evidence grid maps a value to each voxel or pixel that describes the probability that the corresponding location in the environment is occupied.

The method 1000 proceeds to 1006, where a reduced evidence grid is created from the evidence grid. For example, a processor removes data associated with voxels that have a probability of occupancy less than a predefined threshold (e.g., a threshold less than 0.3). Alternatively, the processor removes data in a voxel that is substantially similar to data in neighboring voxels. The method 1000 proceeds to 1008, where the reduced evidence grid is correlated with a reduced historical evidence grid by performing a sequential search for a highest correlative value. In at least one embodiment, a reduced historical evidence grid will be partitioned into several segments, where the objects within each segments are aligned with a coordinate axes for the segment.

For example, the processor performs a search for the highest correlative value by adjusting the position and orientation of the reduced evidence grid in relation to the reduced historical evidence grid in relation to one another and calculating correlative values for the positions and orientations. In a sequential search, the adjusted positions and orientations include translations and rotations that are performed sequentially along individual axes in the coordinate space of the reduced evidence grid and the rotations are performed sequentially about the individual axes. The method proceeds to 1010, where navigational parameters for a navigation system are determined based on the adjusted positions and orientations. For example, a processor determines the position and attitude of a navigation system based on the adjusted position and orientation that yielded the highest correlative value. Also the corrected navigation information is also feedback to the historical evidence.

EXAMPLE EMBODIMENTS

Example 1 includes a method for correlating evidence grids, the method comprising acquiring measurements from a sensor, wherein the sensor generates signals describing a current section of an environment relative to the system; creating an evidence grid from the measurements, wherein the evidence grid describes the probability that a location within the section of the environment is occupied by an object; creating a reduced evidence grid from the evidence grid, wherein the reduced evidence grid describes a surface of at least one object within the current section; correlating the reduced evidence grid with a reduced historical evidence grid by performing a sequential search for a highest correlative value, wherein the sequential search comprises adjusting positions and orientations of the reduced evidence grid and the reduced historical evidence grid in relation to one another and calculating correlative values for the positions and orientations, wherein the adjusted positions and orientations comprises translations and rotations, wherein the translations are performed sequentially along individual axes in the coordinate space and the rotations are performed sequentially about the individual axes; and determining navigational parameters for a navigation system based on the adjusted positions and orientations.

Example 2 includes the method of Example 1, wherein correlating the reduced evidence grid with a reduced historical evidence grid further comprises limiting the magnitude of the translations and the rotations within an error range for a starting location of the sensor at the time the sensor generated the signals.

Example 3 includes the method of Example 2, further comprising performing a global search when the sequential search is unable to correlate the reduced evidence grid with the reduced historical evidence grid, wherein the global search compares the reduced evidence grid and the reduced historical evidence grid across the possible rotations and translations in relation to one another.

Example 4 includes the method of any of Examples 1-3, further comprising dividing the reduced evidence grid into a plurality of evidence grid segments; dividing the reduced historical evidence grid into at least one historical evidence grid segment, performing a segmented sequential search to correlate at least one evidence grid segment in the plurality of evidence grid segments against the at least one historical grid segment.

Example 5 includes the method of any of Examples 1-4, further comprising checking whether the sequential search found the highest correlative value for the possible relative positions between the reduced evidence grid and the reduced historical evidence grid.

Example 6 includes the method of Example 5, wherein checking whether the sequential search found the highest correlative value comprises comparing the highest correlative value encountered during the sequential search with correlative values associated with neighboring relative positions, wherein neighboring relative positions are within a translational and rotational range of the relative position that produced the highest correlative value during the sequential search.

Example 7 includes the method of any of Examples 1-6, further comprising segmenting the reduced historical evidence grid based on an orientation of a plurality of objects describe in the reduced historical evidence grid.

Example 8 includes a system comprising a sensor configured to generate signals describing a current section of an environment relative to the system; a memory configured to store measurements of historical sections of the environment relative to the system; and a processor coupled to the sensor and configured to calculate navigation parameters based on signals received from the sensor; wherein the processor is configured to convert the signals received from the sensor into a current evidence grid and remove data from the current evidence grid to form a reduced evidence grid; wherein the processor is configured to convert the measurements of historical sections into a historical evidence grid; wherein the processor is configured to correlate the reduced evidence grid with the historical evidence grid by adjusting position and orientation of the reduced evidence grid and the historical evidence grid in relation to one another and calculating correlative values for each adjusted position and orientation, and searching for a highest correlative value, wherein the navigation parameters are calculated based on the adjusted position and orientation that yield the highest correlative value.

Example 9 includes the system of Example 8, wherein the adjusted position and orientation comprises translations and rotations, wherein the translations are performed sequentially along individual axes in the coordinate space and rotations are performed sequentially about the individual axes.

Example 10 includes the system of Example 9, wherein the magnitude of the translations and rotations correspond to an error range for a starting location of the system at the time the sensor generated the signals.

Example 11 includes the system of any of Examples 8-10, wherein the historical evidence grid comprises a reduced historical evidence grid, wherein the reduced historical evidence grid is the historical evidence grid where data has been removed.

Example 12 includes the system of any of Examples 8-11, wherein the processor calculates at least one of a Jacobian and a Hessian for the reduced evidence grid and uses the at least one of the Jacobian, the Hessian, and a simulated annealing method when searching for the highest correlative value.

Example 13 includes the system of any of Examples 8-12, wherein the processor is configured to perform a global search for the highest correlative value, wherein the global search compares the reduced evidence grid and the historical evidence grid across possible rotations and translations of the reduced evidence grid and historical evidence grid in relation to one another.

Example 14 includes the system of any of Examples 8-13, wherein the processor is configured to perform a segmented sequential search wherein, the processor divides the reduced evidence grid into a plurality of evidence grid segments and divides the historical evidence grid into at least one historical grid segment, wherein the processor correlates at least one evidence grid segment in the plurality of evidence grid segments with the at least one historical grid segment.

Example 15 includes the system of any of Examples 8-14, further comprising an inertial sensor configured to provide inertial measurements of the system, wherein the processor calculates a navigation solution for the system based on the inertial measurements and the navigation information.

Example 16 includes the system of any of Examples 8-15, wherein the reduced evidence grid contains data for pixels that have an associated probability of occupancy greater than an occupancy threshold.

Example 17 includes the system of any of Examples 8-16, wherein the reduced evidence grid contains data for pixels, wherein the difference between the data and information associated with at least one neighboring pixel is greater than a difference threshold.

Example 18 includes a program product comprising a processor-readable medium on which program instructions are embodied, wherein the program instructions are configured, when executed by at least one programmable processor, to cause the at least one programmable processor to acquire measurements from a sensor, wherein the sensor generates signals describing a current section of an environment relative to the system; create an evidence grid from the measurements, wherein the evidence grid describes the probability that a location within the section of the environment is occupied by an object; create a historical evidence grid from historical measurements representing historical sections of the environment; create a reduced evidence grid from the evidence grid, wherein the reduced evidence grid describes a surface of at least one object within the current section; create a reduced historical evidence grid from the historical evidence grid, wherein the reduced historical evidence grid describes the surface of the at least one object within the historical sections; and correlate the reduced evidence grid with the historical evidence grid by adjusting position and orientation of the reduced evidence grid and the historical evidence grid in relation to one another and calculating correlative values for each adjusted position and orientation, and searching for a highest correlative value; and determine navigational parameters for a navigation system based on the adjusted positions and orientations associated with the highest correlative value.

Example 19 includes the program product of Example 18, wherein the program instructions are further configured to cause the at least one programmable processor to sequentially adjusts the position and the orientation of the reduced evidence grid by sequentially translating the position of the reduced evidence grid along individual axes in a coordinate space containing the reduced evidence grid and sequentially rotating the reduced evidence grid about the individual axes in the coordinate space.

Example 20 includes the program product of any of Examples 18-19, wherein the program instructions are further configured to cause the at least one programmable processor to perform a global search of possible relative positions between the reduced evidence grid and the reduced historical evidence grid.

This description has been presented for purposes of illustration, and is not intended to be exhaustive or limited to the embodiments disclosed. A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A method for correlating evidence grids, the method comprising:
    acquiring measurements from a sensor, wherein the sensor generates signals describing a current section of an environment relative to the system;
    creating an evidence grid from the measurements, wherein the evidence grid describes the probability that a location within the section of the environment is occupied by an object;
    creating a reduced evidence grid from the evidence grid, wherein the reduced evidence grid describes a surface of at least one object within the current section;
    correlating the reduced evidence grid with a reduced historical evidence grid by performing a sequential search for a highest correlative value, wherein the sequential search comprises adjusting positions and orientations of the reduced evidence grid and the reduced historical evidence grid in relation to one another and calculating correlative values for the positions and orientations, wherein the adjusted positions and orientations comprises translations and rotations, wherein the translations and the rotations performed in the adjusted positions and orientations are performed to identify the highest correlative value along an individual degree of freedom; and
    determining navigational parameters for a navigation system based on the adjusted positions and orientations.

2. The method of claim 1, wherein correlating the reduced evidence grid with a reduced historical evidence grid further comprises limiting the magnitude of the translations and the rotations within an error range for a starting location of the sensor at the time the sensor generated the signals.

3. The method of claim 2, further comprising performing a global search when the sequential search is unable to correlate the reduced evidence grid with the reduced historical evidence grid, wherein the global search compares the reduced evidence grid and the reduced historical evidence grid across the possible rotations and translations in relation to one another.

4. The method of claim 1, further comprising:
    dividing the reduced evidence grid into a plurality of evidence grid segments;
    dividing the reduced historical evidence grid into at least one historical evidence grid segment,
    performing a segmented sequential search to correlate at least one evidence grid segment in the plurality of evidence grid segments against the at least one historical grid segment.

5. The method of claim 1, further comprising checking whether the sequential search found the highest correlative value for the possible relative positions between the reduced evidence grid and the reduced historical evidence grid.

6. The method of claim 5, wherein checking whether the sequential search found the highest correlative value comprises comparing the highest correlative value encountered during the sequential search with correlative values associated with neighboring relative positions, wherein neighboring relative positions are within a translational and rotational range of the relative position that produced the highest correlative value during the sequential search.

7. The method of claim 1, further comprising segmenting the reduced historical evidence grid based on an orientation of a plurality of objects describe in the reduced historical evidence grid.

8. A system comprising:
    a sensor configured to generate signals describing a current section of an environment relative to the system;
    a memory configured to store measurements of historical sections of the environment relative to the system; and
    a processor coupled to the sensor and configured to calculate navigation parameters based on signals received from the sensor;
    wherein the processor is configured to convert the signals received from the sensor into a current evidence grid and remove data from the current evidence grid to form a reduced evidence grid;
    wherein the processor is configured to convert the measurements of historical sections into a historical evidence grid;
    wherein the processor is configured to correlate the reduced evidence grid with the historical evidence grid by performing a sequential search for a highest correlative value, wherein the sequential search comprises finding adjusted positions and orientations of the reduced evidence grid and the historical evidence grid in relation to one another and calculating correlative values for the adjusted positions and orientations, wherein translations and orientations performed in the adjusted positions and orientations are performed to identify the highest correlative value along an individual degree of freedom, and wherein the navigation parameters are calculated based on the adjusted positions and orientations.

9. The system of claim 8, wherein the adjusted position and orientation comprises translations and rotations, wherein the translations are performed sequentially along individual axes in the coordinate space and rotations are performed sequentially about the individual axes.

10. The system of claim 9, wherein the magnitude of the translations and rotations correspond to an error range for a starting location of the system at the time the sensor generated the signals.

11. The system of claim 8, wherein the historical evidence grid comprises a reduced historical evidence grid, wherein the reduced historical evidence grid is the historical evidence grid where data has been removed.

12. The system of claim 8, wherein the processor calculates at least one of a Jacobian and a Hessian for the reduced evidence grid and uses the at least one of the Jacobian, the Hessian, and a simulated annealing method when searching for the highest correlative value.

13. The system of claim 8, wherein the processor is configured to perform a global search for the highest correlative value, wherein the global search compares the reduced evidence grid and the historical evidence grid across possible rotations and translations of the reduced evidence grid and historical evidence grid in relation to one another.

14. The system of claim 8, wherein the processor is configured to perform a segmented sequential search wherein, the processor divides the reduced evidence grid into a plurality of evidence grid segments and divides the historical evidence grid into at least one historical grid segment, wherein the processor correlates at least one evidence grid segment in the plurality of evidence grid segments with the at least one historical grid segment.

15. The system of claim 8, further comprising an inertial sensor configured to provide inertial measurements of the system, wherein the processor calculates a navigation solution for the system based on the inertial measurements and the navigation information.

16. The system of claim 8, wherein the reduced evidence grid contains data for pixels that have an associated probability of occupancy greater than an occupancy threshold.

17. The system of claim 8, wherein the reduced evidence grid contains data for pixels, wherein the difference between the data and information associated with at least one neighboring pixel is greater than a difference threshold.

18. A program product comprising a non-transitory processor-readable medium on which program instructions are embodied, wherein the program instructions cause at least one programmable processor to:

acquire measurements from a sensor, wherein the sensor generates signals describing a current section of an environment relative to the system;

create an evidence grid from the measurements, wherein the evidence grid describes the probability that a location within the section of the environment is occupied by an object;

create a historical evidence grid from historical measurements representing historical sections of the environment;

create a reduced evidence grid from the evidence grid, wherein the reduced evidence grid describes a surface of at least one object within the current section;

create a reduced historical evidence grid from the historical evidence grid, wherein the reduced historical evidence grid describes the surface of the at least one object within the historical sections; and correlate the reduced evidence grid with the historical evidence grid by adjusting position and orientation of the reduced evidence grid and the historical evidence grid in relation to one another and calculating correlative values for each adjusted position and orientation, and searching for a highest correlative value; and determine navigational parameters for a navigation system based on the adjusted positions and orientations associated with the highest correlative value.

19. The program product of claim 18, wherein the program instructions are further configured to cause the at least one programmable processor to sequentially adjusts the position and the orientation of the reduced evidence grid by sequentially translating the position of the reduced evidence grid along individual axes in a coordinate space containing the reduced evidence grid and sequentially rotating the reduced evidence grid about the individual axes in the coordinate space.

20. The program product of claim 18, wherein the program instructions are further configured to cause the at least one programmable processor to perform a global search of possible relative positions between the reduced evidence grid and the reduced historical evidence grid.

* * * * *